July 3, 1962 F. A. KROHM 3,041,653
WINDSHIELD WIPER ASSEMBLY
Filed Feb. 8, 1960
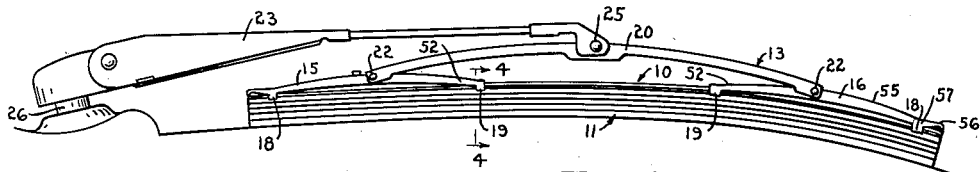
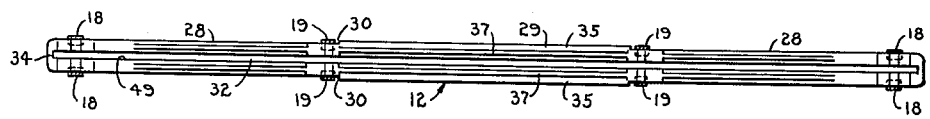
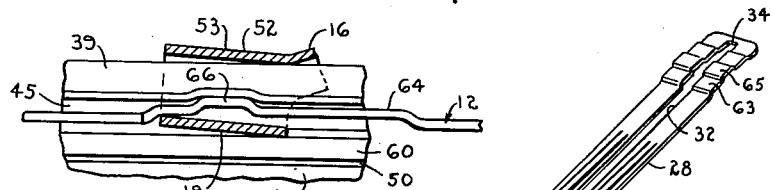
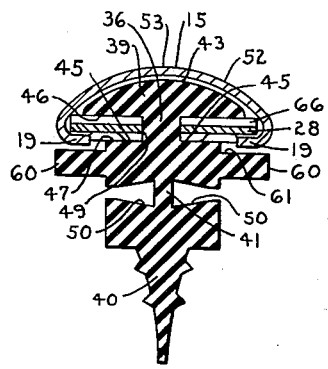
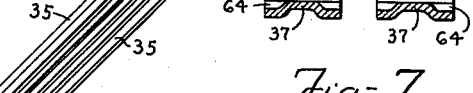
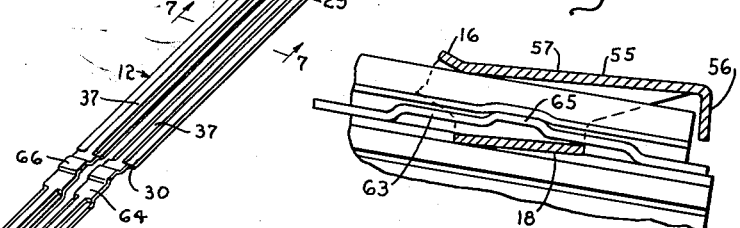
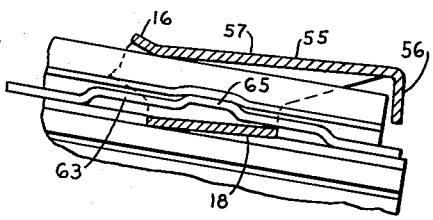
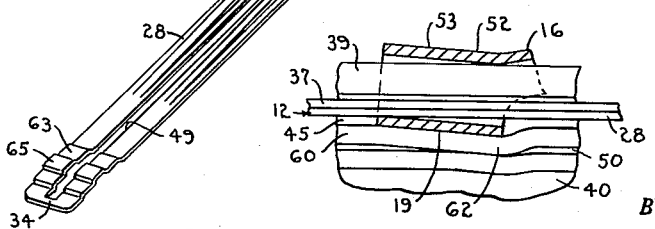
INVENTOR.
FRED A. KROHM
BY
W. E. Recktenwald
ATTORNEY

United States Patent Office 3,041,653
Patented July 3, 1962

3,041,653
WINDSHIELD WIPER ASSEMBLY
Fred A. Krohm, Hobart, Ind., assignor to The Anderson Company, a corporation of Indiana
Filed Feb. 8, 1960, Ser. No. 7,385
8 Claims. (Cl. 15—250.42)

This invention relates to windshield wipers and more particularly to improvements in windshield wiper blade structures.

Windshields currently in use on most vehicles are of the flat, curved or wrap-around type so that wiper blades have been made flexible to permit ready accommodation of the blade to the varying conditions or contours of the windshield, as set out in the basic patent to John W. Anderson, No. 2,596,063 issued May 6, 1952. These wiper blades consist of a rubber wiper or squeegee element, a resiliently flexible holder or supporting strip to which said squeegee element is mounted, and an articulated superstructure extending along and operatively connected to said supporting strip. The superstructure is adapted for connection to a wiper arm for driving the wiper blade across the windshield as it urges the wiper or squeegee element into conformity with the surface of said windshield. considerable effort has been spent in devising wiper blades that adjust themselves throughout their length to the curvature of the windshield at all phases of the wiper stroke, and thus eliminate streaking, chatter and the like.

With the foregoing in mind, it is the primary object of this invention to provide a flexible blade unit of the kind mentioned above which will adjust itself to a flat or curved surface and wipe the same without streaking.

A further object of this invention is to provide an improved flexible blade which will substantially eliminate undesirable distortion of the wiping element immediately under the connections between the superstructure and the flexible backing means of the wiper blade.

A more specific object of this invention is to provide an improved wiper structure having one of the elements of the structure so constructed as to eliminate the tendency of the claws of the superstructure to cause streaking or scratching on the surface of the windshield.

A still further object of this invention is to provide a wiper blade having means on the supporting strip cooperating with the pressure-distributing superstructure and resilient back portion of the wiper element for reducing play between parts of the blade.

Other and further objects and advantages of the invention will become apparent after the description hereinafter set forth is considered in conjunction with the accompanying drawings.

In the drawings:

FIGURE 1 is a side view of a windshield wiper structure as applied to a windshield incorporating the present invention;

FIGURE 2 is a bottom view of the holder, flexor or supporting strip of the present invention as employed in the structure of FIGURE 1;

FIGURE 3 is a perspective view of said flexor or holder strip;

FIGURE 4 is an enlarged cross-sectional view taken along line 4—4 of FIGURE 1;

FIGURE 5 is a detail view partially in section of the connection between one end of the pressure-distributing superstructure and the wiper blade;

FIGURE 6 is a detail view partially in section of the connection between the other end of the pressure-distributing superstructure and the wiper blade;

FIGURE 7 is a cross-sectional view taken along line 7—7 of FIGURE 3; and

FIGURE 8 is a view similar to the detail view of FIGURE 5, only depicting the prior art structure.

As exemplified in the drawings, the present windshield wiper blade unit or assembly 10 is of the flexible type adapted for operation on either a flat or curved surface. The blade shown corresponds in some respects to the blade unit disclosed in my U.S. Patent No. 2,782,445, issued February 6, 1957. The present blade comprises a wiper or squeegee element 11 of rubber or equivalent material, a slotted resiliently flexible holder, flexor or supporting strip 12 receiving said wiper element in said slot therein, and a pressure-distributing superstructure 13 connected to the supporting strip. The superstructure includes secondary yokes 15, 16, one being disposed near each end portion of the supporting strip and connected to the latter through inturned claws 18, 19, and a primary yoke or bridge member 20 having its ends pivoted at 22 to an intermediate portion of each of the secondary yokes. A power-driven oscillatory wiper arm 23 is rockably connected at 25 to an intermediate portion of the primary bridge 20. The other end of the arm 23 is connected to a pivot shaft 26 extending through the cowl of the vehicle and is oscillatably driven relative to the windshield. Arm 23 includes conventional spring means for biasing the arm toward the windshield to thereby apply pressure upon the blade unit, whereby the blade unit is flexed to conform to the curvature of the windshield.

More particularly, the holder strip or flexor 12 is generally uniform in thickness, is substantially flexible in the direction of the windshield and is substantially inflexible in a direction parallel to the windshield. The holder or flexor 12 has corresponding reduced end portions 28 and an intermediate portion 29 of a greater width than said end portions. Each reduced portion 28 is of a length to receive one of the secondary yokes 15, 16 thereon. The junctures of said intermediate and reduced end portions form shoulders 30 which define abutments for the claws 19 at either end of the intermediate portion of the holder strip. The holder strip 12 is also provided with a narrow slot 32, terminating short of the ends of the holder or flexor to provide connecting hinge portions 34, whereby the parallel side portions 35 of the holder or flexor can be spread apart to enlarge the size of slot 32 so that a neck 36 of the wiper element can be inserted readily therein, after which the side portions are released to cause said portions to interlock with the element as shown in FIGURE 4.

The intermediate portion 29 of the flexor or holder has formed in each side portion 35 a longitudinally disposed rib 37 which is substantially an inverted U-shape in cross section (FIGURE 7). The ribs 37 extend into the respective end portions 28 and gradually taper or flatten out as the extreme ends of the flexor or holder are approached (FIGURES 2 and 3). The ribs 37 are adapted to add a certain degree of stiffness to the blade in the intermediate portion 29 and to add a gradually varying and lesser degree of stiffness to the flexor as the outer ends are approached.

The squeegee or wiping element 11 is preferably formed in one piece and, as viewed in cross section in FIGURE 4, the wiping element may be said to be comprised of a connector or back portion 39 to be mounted in the holder strip 12 and a wiping portion 40 joined to the connector portion through a flexible hinge portion 41. Back portion 39 has an arcuate back side 43, and has lateral sides formed with oppositely facing narrow parallel grooves 45 extending lengthwise thereof to provide upper and lower walls 46, 47 and the neck 36. Grooves 45 receive the inner marginal edges 49 of the parallel side portions 35 of the holder, with neck 36 between said portions so that the upper wall 46 and the lower wall 47 of the back portion engage the upper and lower surfaces, respectively, of the holder, as best shown in FIGURE 4. The wiping element is further formed with a second pair of oppositely facing grooves 50 running lengthwise thereof to provide for the hinge portion 41 permitting controlled pivotal movement of the wiping portion 40 relative to the back portion 39.

The yokes 15, 16 are preferably formed from sheet metal, are substantially U-shaped in cross section and are relatively rigid. The secondary yokes are shown as identical in design and construction. The inner end 52 of each of the secondary yokes is formed to provide a transverse arcuate-shaped portion 53 on its underside with the pair of corresponding inturned claws 19 below said arcuate-shaped portion. The outer end 55 of each secondary yoke is formed with a downturned lip 56 which serves to conceal the end of the holder strip. The outer end of each of the secondary yokes is also formed with a portion 57 which is arcuate-shaped in cross section and terminates with the pair of inturned claws 18, the claws being spaced inwardly from the lip 56, as best shown in FIGURE 6.

As clearly shown in FIGURE 4, the arcuate-shaped portions 53, 57 of the secondary yokes conform generally to the curvature of the arcuate back 39 of the back portion of the wiping element. The inner pairs of claws 19 of the secondary yokes extend under the side edges of the reduced extremities 29 of the holder and are adapted to engage abutments 30, and the corresponding outer claws 18 of the yokes similarly extend under side edges of the end portion of the holder. In effect, the arcuately shaped portions 53, 57 and the claws define channels or ways for slidably receiving the holder or flexor. The secondary yokes are preferably assembled with the flexor by merely sliding the yokes inwardly along the extremities of the flexor until the claws of the inner ends of the yokes engage abutments 30, after which the primary yoke is attached in a well-known manner. In addition to connecting the pressure-distributing superstructure to the wiper arm 23, the bridge member 20 retains the secondary yokes 15, 16 against separation; while abutments 30 on the flexor limit movement of the superstructure lengthwise of the flexor.

It will be noted that the back portion 39 of the wiping element 11 of the present disclosure includes a flange or lateral extension 60 projecting from either side thereof. Flanges 60 are located beneath holder 12, contiguously underlie claws 18, 19, terminate substantially even with the sides of arcuate portions 53, 57 of the secondary yokes, and extend substantially the length of the flexor. The upper surface of each flange 60 is undercut at 61 to provide a spacing between the top surface of the flange 60 and the bottom surface of the flexor 12. The purpose of the flanges 60 is to shield claws 18, 19 so the latter cannot scratch the windshield in the event the blade should roll over excessively during the wiping stroke.

According to the prior art as shown in FIGURE 8, with the side flanges 60 underlying the claws 18, 19 of the yokes, it has been found that the claws, in canting between the extreme operative positions, sometimes bear against the upper surface of the flanges 60 to distort or cause a lump 62 in the immediately contiguous portion of the flange in the direction of the wiping portion 40 of the wiper blade. The lump 62 bridges the groove 50 in the wiping portion causing distortion in the area of the wiping lip of the blade. This lump or distortion of the flange 60 and wiping portion causes, under certain conditions, streaking of the windshield.

According to the present invention, each side portion 35 of the holder strip or flexor 12 has at several longitudinal portions therealong, where the claws 18, 19 engage with its side edges, struck-up offset or deformed bearing areas or surfaces 63 near the opposite ends of the flexor and 64 near the intermediate portion 29. Thus, the bearing areas 64 for the inner arcuate portion 53 and claws 19 of the yokes are located adjacent abutments 30, while the outer bearing areas 63 for claws 18 are at the extreme ends of the flexor. The vertical extent of the offset between portions 28 and the bearing surfaces 63, 64 may vary somewhat depending upon the normal space between flexor 12 and the flange 60, as well as the amount of play allowed between the flexor 12, the claws 18, 19, the back edge 43 of the back portion 39 and the arcuate ends of the yokes 15, 16.

The bearing surfaces 63, 64 are somewhat longer than the longitudinal length of the claws so as to permit the claws to slide along the surfaces to accommodate to the flexing of holder 12 as the wiper is traversed across a windshield. Each bearing surface or area 63, 64 has a struck-up or deformed portion 65, 66 respectively, defining a ledge or rib having an axis extending transverse to the axis of the flexor. The longitudinal extent of the ledges or ribs 65, 66 is relatively short by comparison to the extent of the associated bearing surfaces 63, 64. The ledges or ribs 65, 66 are so located along the flexor and relative to the secondary yokes 15, 16 that the upper exposed corner (see FIGURE 4) of each rib bears against a part of the inner arcuate surfaces 53, 57 of the yokes so as to raise the underportion of the claws 18, 19 relative to the bottom surface of the flexor. The contacting upper exposed or outer edges of the ledges 65, 66 create substantially a line contact with the inner surface of the arcuate ends of the yokes so that the flexor and yoke rock relative to each other along the longitudinal axis of the flexor along said line of contact as the wiper blade accommodates to the varying curvatures of the windshield.

As is shown in FIGURES 5 and 6, the ledges or ribs 65, 66 on the bearing surfaces 63, 64 bear against the inner surfaces of the ends of the yokes to raise the claws relative to the lower face of the flexor and combine with the undercut portion 61 of the top surface of the flange 60 so that in the extreme positions of canting between the claws 18, 19 and the flexor (the extremes being shown in FIGURES 5 and 6), the longitudinal ends of the claws 18, 19 do not materially engage with the flange 60 so that the flange is not distorted or lumped in the direction of the windshield. In this way, the claws do not create a condition whereby the windshield is streaked by distortion of the flange 60. The claws 18, 19 rock freely relative to the flexor and adjust longitudinally so that the wiper blade cleans the windshield surface throughout the wipe pattern.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:
1. A windshield wiper blade comprising a supporting element adapted to receive pressure-distributing yoke means having claws at each end thereof for engaging around the side edges of said supporting element, a squeegee element carried by said supporting element, side portions of said squeegee element contiguously underlying the outer side edges of said supporting element, and one of said elements being formed with upwardly deformed offsets for receiving said claws, said offsets being of a depth sufficient to prevent distortion of said contiguously underlying side portions of said squeegee.

2. A windshield wiper blade comprising a resiliently flexible backing element, yoke means having claws at each end thereof engaging the side edges of said backing strip, a squeegee element carried by said backing strip, said squeegee element having oppositely projecting flanges contiguously underlying the outer side edge portions of said backing strip, one of said elements being formed with offsets receiving said claws, each of said offsets having a flat bottom and being of a depth sufficient to hold the lower face of the claws out of distorting contact with said projecting flanges.

3. A windshield wiper blade comprising a supporting element resiliently flexible in the direction of the windshield adapted to receive pressure-distributing means having at each end thereof pairs of inturned claws for engaging the side edges of said supporting element, an elongate squeegee carried by said supporting element, said squeegee having flanges projecting from the sides thereof and contiguously underlying the outer side edges of said supporting element and said claws, and offset bearing means formed by an upwardly raised portion in the supporting element for receiving said claws therein.

4. In a windshield wiper blade assembly and in combination: elongate flexible backing means, a resilient wiping element operatively associated with said backing means, a pressure-distributing superstructure extending along the length of said backing means and said wiping element and adapted to apply pressure thereto at longitudinally spaced points, flange means outwardly extending from said wiping element beneath and substantially contiguous with said backing means, and means formed upwardly from said backing means at said longitudinally spaced points of pressure application from the superstructure to receive holding means from the superstructure for substantially eliminating distortion of said flange means at said points of pressure application.

5. A windshield wiper comprising a flexible wiper element of elastomeric material, said wiper element including a back portion having an arcuate-shaped back and a wiping portion hinged thereto, said back portion being formed with parallel oppositely facing grooves extending lengthwise of said back portion and defining a neck portion, resiliently flexible backing means disposed in said grooves and engaging with said neck portion, said backing means being formed with a plurality of pairs of upwardly offset bearing areas extending transverse to the axis of said backing means, a plurality of yokes, and inturned claws carried by each end of said yokes for engaging the edges of said offset bearing areas.

6. A windshield wiper comprising a flexible wiper element of elastomeric material, said wiper element including an arcuate back portion and a squeegee portion integral therewith, said back portion being formed with parallel oppositely facing narrow grooves extending lengthwise thereof for defining a neck portion, backing means having a slot formed lengthwise therein, said neck portion being disposed within the slot of said backing means with the contiguous inner side edges of said backing means within said grooves, said backing means being formed with a plurality of pairs of offset bearing areas extending transverse to the axis of said backing means, a rib extending across the upper surface of each bearing area, and a pressure-distributing superstructure, the operative ends of said superstructure having arcuate portions receiving said arcuate back portion and terminating in claws embracing said rib and bearing area of the backing means so as to hold the undersurface of said claws substantially out of engagement with said wiper element.

7. A windshield wiper comprising a supporting element having end portions of less width than an intermediate portion forming at their junctures abutments on either side edge of said element, yoke means having at each end pairs of inturned claws engaging the side edges of said element, an elongate wiping element carried by said supporting element, said wiping element having side portions contiguously underlying the edges of said supporting element and said claws, said end portions of said supporting element being deformed upwardly to define offset bearing areas extending transverse to the axis of the supporting element, said bearing areas being longitudinally spaced apart for receiving said claws therearound, ribs formed upwardly in said bearing areas transverse to the axis of the supporting element, the outer edges of said ribs bearing against the inner surface of said ends of the yokes to raise the claws into the offset bearing areas in said support element whereby said claws are held out of engagement with said contiguous side portions of the wiping element.

8. A windshield wiper comprising in combination; an elongate flexible wiping element having a back portion and a squeegee portion, a pair of oppositely facing parallel grooves extending along the length of the wiping element, said grooves having upper and lower faces and a back face defining a neck portion, an elongate resilient support member having a slot lengthwise thereof defining a pair of parallel side portions positioned astride the neck portion and located within the oppositely facing parallel grooves, pressure-applying superstructure means having end portions terminating in claws received underneath spaced-apart bearing areas along the length of the parallel side portions of the support member, said bearing areas defined by upward deformations, ribs projecting above the upward deformations to bear against the inner surfaces of the end portions of the superstructure means for holding the claws in operative relation with respect to said bearing areas.

References Cited in the file of this patent
UNITED STATES PATENTS

| | | |
|---|---|---|
| 2,796,623 | Nesson | June 25, 1957 |
| 2,861,289 | Nesson | Nov. 25, 1958 |
| 2,920,336 | Anderson | Jan. 12, 1960 |
| 2,942,288 | Zaiger | June 28, 1960 |